Figures 1, 2:
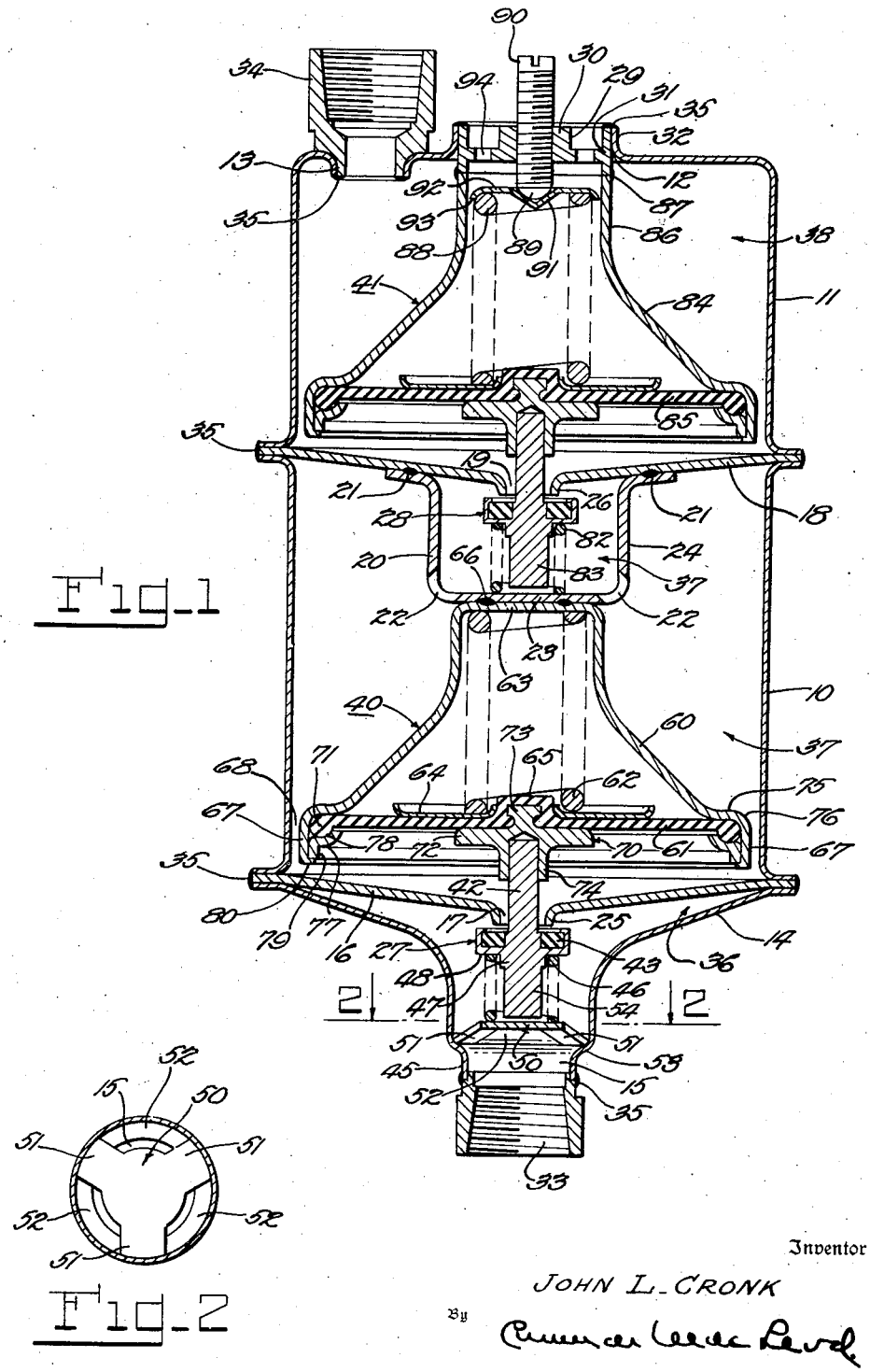

Nov. 25, 1958 J. L. CRONK 2,861,588
FLUID PRESSURE REGULATORS
Filed Dec. 30, 1954

Inventor:
JOHN L. CRONK
By
Attorney

United States Patent Office 2,861,588
Patented Nov. 25, 1958

2,861,588

FLUID PRESSURE REGULATORS

John L. Cronk, Milton, Mass., assignor, by mesne assignments, to Worthington Corporation, New York, N. Y., a corporation of Delaware Application December 30, 1954, Serial No. 478,639

3 Claims. (Cl. 137—505.12)

This invention relates to an improvement in regulating valves, the object in general being to provide an inexpensive, compact device to maintain a discharge fluid pressure within close limits under relatively wide changes in supply pressure. While the regulator embodying this invention may be utilized in connection with the regulation of gaseous fluids, it is particularly adapted for use in the control of liquid where it is desirable that the regulator be completely self-draining when the system under control is shut down. And while the regulator embodying this invention is herein illustrated as including two stages of regulation, it will be apparent from the following description that it may include one or more stages as required to meet the control conditions.

One form of control for which the regulator is particularly designed is in connection with a dispensing machine for soft drinks, wherein the drink liquid is stored in containers and pressurized by $CO_2$ gas both for the purpose of charging the liquid and for expelling it from the machine. The dispensing machine may include a suitable cooler and a time controlled dispensing faucet which may be coin actuated to remain open for a selected period of time, such as required to fill a cup or like receptacle. Machines of this type must comply with pure food regulations, thereby rendering it necessary to provide a regulator, of suitable materials such as stainless steel, which is free from pockets and is completely self-draining when the machine is shut down.

The regulation of liquid flow from a dispensing machine presents a difficult problem since the vapor pressure of $CO_2$ gas is extremely susceptible to changes in atmospheric temperature, and therefore during the normal operation of the machine, the vapor pressure may vary over a wide range of pressure change. For example, $CO_2$ gas supplied to storage containers, under regulated pressure from a charged cylinder, may vary from 40 p. s. i. to 90 p. s. i., and since the volumetric flow from the dispensing faucet must be held within very close limits to provide the quantity required to be dispensed over a given period of time, the regulator must be capable of maintaining a discharge pressure with substantially no noticeable variation under wide changes in supply pressure. Furthermore, the regulator may be associated with cooling coils through which the dispensed liquid flows, the temperature of which is reduced by some cooling medium, such as ice cold water, and therefore the regulator may be required to function when it is partially or entirely submerged in the cooling medium. Again, the available space in a dispensing machine is limited, thereby necessitating the use of a small, compact regulating device which is capable of functioning successfully under difficult and exacting control conditions.

It is an object of this invention to provide a regulator which is adapted to maintain a constant discharge pressure within narrow limits of pressure change under wide variations in supply pressure.

It is an object of this invention to provide a regulator which is particularly adapted to the control of liquids, wherein the requirements are such that contamination of liquid passing through the device must be avoided and the regulator must be self-draining when the system under control is shut down.

And it is still another object of this invention to provide a self-contained regulator of compact construction which is inexpensive to produce and which is capable of meeting exacting control requirements under difficult operating conditions.

These and other objects of this invention will more fully appear from the following description when taken in connection with the accompanying drawings, in which Fig. 1 is a vertical section of a two-stage regulator embodying this invention, and Fig. 2 is a horizontal section taken on the line 2—2 of Fig. 1.

Having reference to the drawings, the regulator embodying this invention is provided with a housing which consists of a lower body member 10 in the shape of a hollow cylinder, an upper body member 11 in the form of an inverted cup with a central opening 12 at the top and a second opening 13 adjacent thereto, and a bottom member 14, shaped in the form of an inverted bell, having a central opening 15 in the lower portion thereof. Disposed between the bottom member 14 and the lower body member 10 is a partition 16, of shallow dish shape, having a central orifice 17. A partition 18 of similar shape, also having a central orifice 19, is disposed between the lower body member 10 and the upper body member 11. A cup-shaped combined stop and supporting member 20 is secured to the partition 18, preferably by resistance welding 21, and is provided with openings 22 at the junction of its bottom 23 and side wall 24. The orifices 17 and 19 are surrounded by depending flanges 25 and 26, respectively, which function as seating surfaces for valve members 27 and 28, to be described. A filler piece 29 is secured in the opening 12 to the upper body member 11. It has a central cylindrical enlargement 30 and an annular flange 31 which fits closely within a flange 32 surrounding the opening 12. A threaded inlet connection 33 is provided in the central opening 15 of the bottom member 14, and the opening 13 in the upper body member 11 has a threaded outlet connection 34.

The parts hereinabove referred to, with the exception of the inlet and outlet connections 33 and 34, and the filler piece 29 are so constructed and arranged that they may be stamped from suitable material, such as stainless steel, and therefore provide an exceedingly strong and inexpensive construction. These parts may be flanged at the joints and, together with the inlet and outlet connections and filler piece, may be secured by welding as indicated at 35 to provide a leak proof valve housing. By means of the partitions 16 and 18, the regulator body is divided into an inlet chamber 36, a first stage pressure reduction chamber 37, and a second stage pressure reduction chamber 38.

The body members, just described, and the control mechanism, now to be referred to, are so arranged that the regulator is free from pockets which would tend to hold and stagnate the liquid being controlled, and when a dispensing machine, or other process for which the valve is utilized, is shut down, the liquid drains freely from the regulator body. The control mechanism consists of a first stage valve assembly and a second stage valve assembly which are generally indicated at 40 and 41 respectively. The first stage valve assembly 40 includes the valve member 27 located in the inlet chamber 36 and having a stem 42 which extends through the orifice 17 into the first stage pressure reduction chamber 37. The valve member 27 is provided with an annular recess within which a perforated disk 43 of soft material, such as rubber, is received. The disk 43 surrounds the stem 42 and is adapted to seat against the face of the downwardly turned flange 25 formed on the partition 16 around the orifice. The inlet connection 33 is welded, as indicated, to a cylindrical portion 45 around the opening 15 of the bottom member 14. Beneath the valve member 27 is a light helical spring 46 which surrounds a guide portion 47 on the valve member 27 and engages a shoulder 48 formed thereby. The lower end of the spring 46 rests on a spider 50 which has downwardly flaring tabs 51 with openings 52 therebetween as shown in Fig. 2. The tabs 51 are removably supported by means of an inner concave portion 53 with which the bottom member 14 is provided. The spider openings 52 afford free fluid communication between the inlet connection 33 and the inlet chamber 36. The valve member 27 carries a cylindrical extension 54 which engages the spider 50 and determines the lower limit of travel of the valve member, and therefore the spider functions as a combined spring support and stop member.

The first stage valve assembly 40 also includes a diaphragm-spring assembly consisting of a bell-shaped casing 60, which may also be a metal stamping, a diaphragm 61 sealed to the open end of the casing, and a spring 62 mounted within the casing and confined between the closed top 63 of the bell and a diaphragm plate 64 which surrounds an upwardly extending central portion 65 with which the diaphragm is provided. The upper surface of the closed top 63 of the casing conforms to the lower surface of the bottom 23 of the supporting member 20, the parts being in fluid tight engagement and secured together, preferably by resistance welding 66. The casing 60 which is supported by the member 20 in the first stage pressure reduction chamber 37 is open at its lower end and is provided with a depending flange 67 which is spaced as indicated at 68 from the wall of the lower body member 10. The parts just referred to are arranged so that liquid can drain freely through the normally open valve member 27 when the inlet chamber 36 is not subjected to supply pressure.

The diaphragm 61, for the purpose herein referred to, is preferably of pure gum rubber. It is molded with a valve actuator insert 70 at the center and has a generally cylindrical margin 71. The actuator 70 consists of a disk portion 72 having a solid cylindrical part 73, T-shaped in cross section, and a hollow cylindrical depending extension 74. The diaphragm adheres to the part 73 and to the upper surface of the disk portion 72 to make a tight joint therewith. The upper end of the stem 42 of the valve member is received within the hollow cylindrical portion 74 of the actuator, with which portion the stem makes a reasonably snug fit and in which it is retained by the spring 46.

The pure gum rubber of which the diaphragm 61 may consist compresses very easily, and in order to assure a tight joint with the bell casing 60, the molded diaphragm is provided with the generally cylindrical margin 71. The lower edge of the bell is flanged outwardly at 75, is rounded at 76 to fit the cylindrical margin of the diaphragm, and is then flanged downwardly at 67 as referred to above. A metal ring 77, also a stamping, has a concave central portion 78 shaped to fit against the diaphragm marginal portion 71. At the lower side of the concave portion 78, the ring flares downwardly at 79 and is engaged by an inwardly extending flange 80 which is preferably formed by spinning over the lower edge of the bell, thereby forcing the ring against the margin of the diaphragm. By this means the joint is made at the extreme peripheral edge of the diaphragm so that when the diaphragm is flexed and thereby stretched in operation, the peripheral enlargement will be unaffected and a tight joint assured. It will be noted that the casing 60 and diaphragm 61 define a spring chamber which is completely sealed from the first stage pressure reduction chamber 37 so that the structure is free from any form of pocket in which liquid can become entrapped and complete drainage thereby interfered with.

The second stage valve assembly 41 is generally similar to the first stage assembly 40 but differs therefrom in certain respects. It includes the valve member 28 which corresponds in structure to the valve member 27 described above. The valve member 28 rests on a helical spring 82 which is supported on the upper surface of the bottom portion 23 of the member 20 with which surface the cylindrical extension 83 of the valve member cooperates to limit the valve opening movement. The assembly also includes a bell-shaped casing 84, suitably constructed for stamping, and a molded diaphragm 85, these parts being similar to the first stage spring case and diaphragm assembly hereinabove described, with the exception that the casing 84 has a neck portion 86 which is welded at 87 to the annular flange 31 of the filler piece 29 and is sealed thereby from the second stage pressure reduction chamber 38.

While the spring 62 has a fixed compression when the regulator is assembled to provide a selected pressure setting for the first stage reduction chamber 37, it is desirable to have adjustment means for the spring 88 of the second stage valve assembly. For this purpose the cylindrical enlargement 30 of the filler piece 29 has a central bore through which an adjustment screw 90 is threaded. The screw 90 has a rounded inner end 89 to cooperate with an indented portion 91 at the center of a spring button 92. The button 92 has a peripheral flange 93 for receiving the upper end of the spring 88, the parts being centered in the neck portion 86 of the casing by means of the adjustment screw 90 and cooperating indented portion 91 of the button. One or more breather openings 94 are provided in the filler piece 29 to permit the free flow of a gaseous fluid such as air, or of a liquid, for example a cooling medium, when the regulator is completely submerged therein.

In operation, assume that the inlet pressure varies from 40 p. s. i. to 90 p. s. i., that the spring 62 is set to maintain a pressure of 30 p. s. i. in the first stage pressure reduction chamber 37, and that the screw 90 is adjusted to provide a delivery pressure of 20 p. s. i. in the second stage pressure reduction chamber 38. Assume further that the regulator is governing liquid flow in a process such as that encountered in a liquid dispensing machine, wherein an exact flow, within close limits, is required for a selected period of time as provided by a dispensing faucet. When the dispensing faucet opens, the delivery pressure in the second stage chamber 38 starts to drop, and the diaphragm 85 flexes downwardly under the force of the spring 88, thereby opening valve member 28 and throttling liquid flow through the orifice 19 to maintain the discharge pressure at 20 p. s. i. Thereupon the pressure in the first stage chamber 37 starts to drop and the spring 62 and diaphragm 61 open the valve member 27 and throttle liquid flow through the orifice 17 in order to maintain the pressure in the first stage chamber 37 at 30 p. s. i. However since the inlet pressure varies over a range from 40 p. s. i. to 90 p. s. i., there will be some variation in pressure around the 30 p. s. i. setting, although this pressure variation in the first stage chamber is not sufficient to cause substantially any noticeable pressure change in the second stage chamber and therefore in the pressure discharge therefrom. From successive tests carried out on liquid with a dispensing valve, wherein the inlet pressure was varied from 30 p. s. i. to 98 p. s. i., there was practically no change in pressure or in flow during the time in which the dispensing faucet was open. Furthermore tests were carried out on a comparable flow of air under similar conditions, wherein an extremely sensitive apparatus for recording pressure change was employed, and it was found that the maximum variation in delivery pressure was 0.010 p. s. i. This slight change provides practically no variation in flow. Thus the regulator is suited to the control of gaseous fluids as well as liquid.

From the above it will be noted that the regulator embodying this invention is compact, is inexpensive to produce, and that the parts are so arranged that they slope towards the inlet connection 33, thereby providing a regulator which is completely self-draining when installed in substantially vertical position with the inlet connection at the bottom.

Various changes may be made in the details of construction and the arrangement of parts illustrated within the spirit of my invention and within the scope of the appended claims.

Having herein described my invention, what I claim and desire to secure by Letters Patent is:

1. In a fluid pressure regulator, a housing, a first partition in the housing having a first control orifice, an inlet connection upstream of said first control orifice, a first valve member cooperating with the first control orifice to vary fluid flow therethrough, a first assembly in said housing downstream of said first orifice, said first assembly including a rigid casing having a flexible wall portion sealed thereto to provide a fluid pressure tight chamber, an operative connection between said flexible wall portion and said first valve member, means in the casing of said first assembly acting against the flexible wall portion in opposition to fluid pressure externally thereof, a second partition in the housing downstream of the first assembly having a second control orifice, a second valve member cooperating with said second control orifice to vary fluid flow therethrough, a second assembly in said housing downstream of said second control orifice, said second assembly including a casing having a fluid tight rigid wall portion and a fluid tight flexible wall portion sealed to said casing to completely segregate fluid within said casing from fluid externally thereof in said housing, an operative connection between the flexible wall portion of said second assembly and said second valve member, means in the casing of said second assembly acting against the flexible wall portion in opposition to fluid pressure externally thereof, an outlet connection downstream of said second control orifice, means supporting said first assembly casing in spaced relation with said partitions and with the wall of said housing, and means supporting said second assembly casing in spaced relation with said second partition and with the wall of said housing.

2. In a fluid pressure regulator, a housing, an inlet connection in the bottom portion of said housing and an outlet connection in the upper portion thereof, a first partition across said housing above said inlet connection having a first orifice, said partition sloping downwardly to said first orifice, a valve member beneath said partition and cooperating with said first orifice, a first assembly in said housing above said first partition, said assembly including a rigid casing having a flexible wall portion sealed at its margin to the lower end of the casing to provide a fluid pressure tight chamber, the wall of said casing sloping outwardly and downwardly to the said margin of the flexible wall portion, an operative connection between the flexible wall portion of said first assembly and said first valve member, means in said casing acting against the flexible wall portion in opposition to fluid pressure externally thereof tending to open said first valve member, a second partition across said housing above said first assembly having a second orifice, said second partition sloping downwardly to said second orifice, a second valve member beneath said second partition and cooperating with said orifice, a second assembly in said housing above said second partition, said second assembly including a casing having a fluid tight rigid wall portion and a fluid tight flexible wall portion sealed at its margin to the lower end of the casing to completely segregate fluid within said casing from fluid externally thereof in said housing, the wall of said casing sloping outwardly and downwardly to the said margin of the flexible wall portion, an operative connection between the flexible wall portion of the second assembly and said second valve member, means in the casing of the second assembly acting against the flexible wall portion in opposition to fluid pressure externally thereof tending to open said second valve member, means supporting said first assembly casing within the housing in spaced relation with said partitions and with the wall of said housing, and means supporting said second assembly casing in spaced relation with said second partition and with the wall of said housing.

3. In a two-stage fluid pressure regulator, a housing including a bottom portion having downwardly sloping walls and an inlet connection at the lower end thereof, a side portion, and a top portion having an outlet connection therein, a partition across said housing above said inlet connection having an orifice therein, a valve member beneath said partition cooperating with said orifice and having a stem extending therethrough, a first bell-shaped casing above said partition open at the lower end, a diaphragm sealed across the open end of said casing to provide a fluid pressure tight chamber, a spring in said casing acting against said diaphragm in opposition to fluid pressure externally thereof, means operatively connecting said valve stem with said diaphragm, a second partition across said housing above said casing having a second orifice therein, said second partition sloping downwardly to said second orifice, a second valve member beneath said second partition cooperating with said second orifice and having a stem extending therethrough, a second bell-shaped casing above said second partition open at the lower end, a diaphragm sealed across the open end of said second casing, said diaphragm and wall portion of said casing being fluid tight to completely segregate fluid within the casing from fluid externally thereof in said housing, a spring in said second casing acting against said last mentioned diaphragm in opposition to fluid pressure externally thereof, means operatively connecting said last mentioned diaphragm with the stem of said second valve member, means supporting said first casing within the housing in spaced relation with said partitions and with the wall of said housing, and means supporting said second casing within the housing in spaced relation with said second partition and with the wall of said housing.

References Cited in the file of this patent

UNITED STATES PATENTS

| | | |
|---|---|---|
| 214,218 | Whaley | Apr. 8, 1879 |
| 282,069 | Frost | July 31, 1883 |
| 868,599 | Coleman | Oct. 15, 1907 |
| 997,272 | Coleman | July 11, 1911 |
| 1,550,668 | Block | Aug. 25, 1925 |
| 1,631,262 | Gourdou | June 7, 1927 |
| 1,658,951 | Stitt | Feb. 14, 1928 |
| 2,737,202 | Baldwin | Mar. 6, 1956 |